United States Patent [19]

Srinivasan

[11] Patent Number: 6,145,002
[45] Date of Patent: Nov. 7, 2000

[54] SYSTEM AND METHOD FOR ACCESSING AN INTERNET SERVICE PROVIDER

[75] Inventor: Thiru Srinivasan, Highlands Ranch, Colo.

[73] Assignees: Qwest Communications International Inc., Denver; MediaOne Group, Inc., Englewood, both of Colo.

[21] Appl. No.: 08/970,552

[22] Filed: Nov. 14, 1997

[51] Int. Cl.[7] ................................................ G06F 15/173
[52] U.S. Cl. ..................... 709/225; 709/228; 709/219; 709/223; 370/546
[58] Field of Search .................................. 709/221, 200, 709/223, 228, 219, 225; 370/546

[56] References Cited

U.S. PATENT DOCUMENTS

| | | | |
|---|---|---|---|
| 5,608,786 | 3/1997 | Gordon | 370/352 |
| 5,745,556 | 4/1998 | Ronen | 379/127 |
| 5,754,630 | 5/1998 | Srinivasan | 379/88.23 |
| 5,805,298 | 9/1998 | Ho et al. | 358/402 |
| 5,809,128 | 9/1998 | McMullin | 379/215 |
| 5,809,242 | 9/1998 | Shaw et al. | 709/217 |
| 5,835,583 | 11/1998 | Hetz et al. | 379/220 |
| 5,841,850 | 11/1998 | Fan | 379/142 |
| 5,889,774 | 3/1999 | Mirashrafi et al. | 370/352 |
| 5,905,736 | 5/1999 | Ronen et al. | 370/546 |

*Primary Examiner*—Glenton B. Burgess
*Assistant Examiner*—Abdullahi E. Salad
*Attorney, Agent, or Firm*—Marsh, Fischmann, Breyfogle

[57] ABSTRACT

An enhanced system and method is provided for network implementation to facilitate network users' access to an Internet Service Provider. The system and method employ an approach whereby a network user may initiate an Internet access request from the user's network interface (e.g., personal computer) and the Internet access service provider (ISAP) may in turn select a station number corresponding with one of a plurality of different Internet Service Providers to provide the desired Internet access. The system and method are particularly apt for use in a telephony environment. In such environment, a central office switch receives a request from a telephony subscriber and suspends processing of the call pending receipt of routing instructions from a service control point. Such service control point selects the telephone number for an ISP from a listing of ISP telephone numbers corresponding with a plurality of different ISPs. Such number is provided to the central office switch to complete call processing. E-mail messaging may be advantageously controlled by an ISAP processor/memory module.

24 Claims, 3 Drawing Sheets

6,145,002

SYSTEM AND METHOD FOR ACCESSING AN INTERNET SERVICE PROVIDER

FIELD OF THE INVENTION

The present invention relates to a method and system for enhancing access to the Internet. The invention is particularly apt for providing Internet access in a telephony service network.

BACKGROUND OF THE INVENTION

Utilization of the Internet continues to rise at a rapid pace. Indeed, business and governmental entities as well as individuals are increasingly relying upon the Internet for research, communication, entertainment and transactional purposes.

Access to the Internet network is provided by Internet servers. Such servers are typically maintained by an Internet Service Provider (ISP) who offers "use" of it's server(s) to customers on a pre-determined, subscription basis.

As will be appreciated, the capacity of any individual Internet Service Provider is limited by the number of servers maintained by such ISP, and during peak usage time periods customers may be unable to make connection with their Internet Service Provider. In many cases, Internet service subscribers are currently forced to wait extended time periods before an Internet connection can be made. Further, it has been recognized that many Internet service customers do not have the degree of need for which they subscribe and are otherwise paying for. In this regard, subscription rates are most typically based on one of a limited number of time-of-usage options.

SUMMARY OF THE INVENTION

In view of the foregoing, the primary general objective of the present invention is to enhance Internet access. More particularly, an objective of the present invention is to enhance Internet access by increasing the availability of and reducing any delays for access to an Internet server. A related objective is to enhance Internet access while maintaining the ability of users to receive e-mail communications.

A further objective of the present invention is to provide for Internet access in a manner that facilitates a wide range of subscription approaches.

Yet another objective of the present invention is to provide for Internet access services in a manner that facilitates consolidation of user billing requirements for communication services.

These and additional objectives can be realized through implementation of the present inventive method and system in a network environment, wherein Internet access is at least partially administered by an "Internet Service Access Provider" ("ISAP"). In use of the invention, an Internet access request message is received from a network user station at a predetermined network address, and one of a plurality of station numbers, is automatically selected by the ISAP. Of importance, the plurality of station numbers corresponds with two or more different ISPs. Upon selection of an ISP station number, the ISAP attempts to direct the request to the selected ISP for Internet access. As will be appreciated, by providing access to the Internet via a selected one of a plurality, or pool, of different ISP's, the present invention can enhance Internet access for users in a network.

In this regard, the present invention preferably provides an arrangement wherein, if connection cannot be made with a first selected ISP station number, another ISP station number is selected and the request is directed accordingly. Such reselection and direction of any given request may continue until a connection is made with the first available ISP comprising the pool of Internet Service Providers.

The inventive method and system may further provide for the provision/use of a network user identification number in conjunction with the processing of a request from a user station. Such identification number may be utilized to facilitate appropriate handling of the request. By way of primary example, such identification number may be utilized to verify that the user station initiating the request is a current subscriber of the Internet access service when such service is provided by an ISAP on a subscription basis. Additionally, the identification number may be employed by the ISAP to determine if the user station has designated a "preferred" ISP. If so, the ISAP will select and direct Internet access requests from the user station to a station number corresponding with the designated ISP on a preferred or priority basis.

Further, the user identification number may be automatically provided to the ISP with whom the user station is ultimately connected. In turn, to facilitate the transmission/receipt of e-mail from/at the user station, the ISP can use the identification number for retrieval of an e-mail address (e.g. assigned by the ISAP) corresponding with the user station from a database maintained by the ISAP. In this regard, it is preferable that the ISAP provide processor/memory capability within the network to receive/store e-mail messages directed to user stations and to execute e-mail retrieval instructions input at a user station. Such ISAP capability is of significance since a given user station may be interconnected with a different ISP each time an Internet service access request is made.

As will be appreciated, while the present invention may be utilized in a variety of different network arrangements, the invention is particularly apt for implementation as a subscription service offered to subscriber stations in a telephony network, wherein the ISAP corresponds with the telephony service provider. In such an application, telephony service subscribers may be provided with a predetermined Internet access service telephone number which can be utilized by customer premises equipment to trigger a message. In this regard, customer premises equipment may include a personal computer (PC), an interface modem, and interconnectable telephone. Preferably, "browser" software is loaded in the customer PC to facilitate "dial-up" Internet request procedures and provide for e-mail communications via the ISAP, as will be further discussed . Upon initiating a call utilizing the Internet access service number, a receiving central office switch may then either suspend processing of the incoming call or route the call to another central office switch of the telephony network that will suspend call processing.

Upon suspension of the incoming call, the central office switch (e.g., an originating or terminating switch) may send a message to an Internet service control point in the telephony network. Together with such message, the central office may advantageously provide a caller identification number (e.g. the telephone number for the corresponding subscriber station). Upon receipt of the message and caller id information, the service control point, or "Internet access manager", may first utilize the caller id information to verify that the telephony service subscriber station requesting Internet access is a subscriber of the Internet access service (e.g. by using the caller id information to search a database listing of service subscribers). If not, an "error" message can be automatically communicated back to the central office switch. Such message may cause the central office switch to launch a "fast busy", "interrupt" or other like message back to the subscriber station. In turn, the browser software at the subscriber station may be provided to interpret such message, and responsively display a user-readable message and terminate the call. By way of example, such user-readable message can indicate that the user is not a current subscriber of the service and provide information as to steps to be taken if subscription is desired.

In the event that the Internet access manager verifies that a given telephony service subscriber requesting Internet access is a subscriber of the Internet access service, the Internet access manager may then determine if a preferred ISP has been designated by the subscriber. If so, a corresponding ISP station number may be selected from one or more numbers included in a database listing. Alternatively, (e.g. if no preferred ISP is designated or if all lines are busy at the preferred ISP), an ISP selector module may select an ISP station number for routing the call. More particularly, the ISP selector module can be provided to select an ISP station number from a plurality of station numbers corresponding with two or more different ISPs on a predetermined basis, e.g. a rotating or "round robin", basis. By way of example, an ISP database comprising a listing of ISP telephone numbers can be accessed by the ISP selector module on a database listing-entry number basis. That is, the ISP selector module may store information (e.g., a database listing entry number/database address) corresponding to the last ISP telephone number retrieved from the database (e.g., entry number n), and upon handling of the next request the ISP selector module will automatically retrieve the next ISP telephone number entry comprising the database listing (e.g., entry number n+1).

After selection of an ISP telephone number (i.e. for a designated preferred ISP or for one selected by the ISP selector module), the ISP access manager then transmits a message with such information back to the central office switch which suspended the subscriber station call pending receipt of the routing information from the Internet access manager. Upon receipt of such information, the central office switch then attempts to route, or direct, the call to the corresponding ISP telephone number. In the event that the corresponding ISP station does not answer the call (e.g. line busy), the central office switch will then again suspend processing of the call, and again send a message to the Internet access manager for receipt of routing information. The above-noted operations are then performed again, pursuant to which another ISP telephone number is provided by the Internet access manager to the central office switch for routing of the call. As noted, if all lines for a designated "preferred" ISP are busy, the ISP selection module may select an ISP station number corresponding with a non-designated ISP. In short, the ISP station number selection process continues until connection with an ISP is made (e.g. with a preferred ISP if available, and otherwise on a "first-available" basis).

Upon connection with an ISP, the central office switch may automatically provide the corresponding caller id number to the ISP. Thereafter, a subscriber station may conduct a full-range of Internet activities, including in particular the transmission of e-mail messages and retrieval of e-mail messages received and stored at an ISAP maintained processor/memory module. In this regard, the ISAP, or telephony service provider, may preferably maintain an e-mail address data base for subscriber stations utilizing the Internet access service. Such data base may index caller id numbers (i.e., subscriber station numbers) to corresponding e-mail addresses. Preferably, the ISAP assigns the e-mail addresses for its subscribers. In this regard, a single e-mail address may be used for more than one subscriber station number if desired by the corresponding subscriber(s) (e.g. a subscriber having multiple station numbers). Further, by utilizing e-mail addresses assigned by an ISAP, it should be noted that an e-mail address may be advantageously utilized by a subscriber(s) anywhere within the geographic region serviced by the ISAP telephony network. As such, an e-mail address may be maintained even if a subscriber's station number changes pursuant to a change of business/residential location within the geographic service region.

To facilitate e-mail communications, each ISP providing service for an ISAP may be provided with ISAP access equipment that automatically employs the caller id number delivered with an Internet access request message to retrieve the e-mail address for the corresponding subscriber station from the ISAP e-mail address database. E-mail transmissions may then be carried out directly from a subscriber station to the Internet via the connected ISP. As noted, the ISAP may provide an e-mail processor and associated memory capabilities for e-mail receipt, storage and retrieval purposes. More particularly, the ISAP processor/memory module may be directly and separately interconnected (e.g. via dedicated lines) with the ISAP access equipment provided to each of the ISPs comprising the pool of ISPs that provide Internet access for the ISAP. By virtue of such arrangement, e-mail messages directed to a given telephony service subscriber station may be automatically received (e.g. from the pool ISPs) and stored at the ISAP processor/memory module. The ISAP processor/memory module and browser software loaded at subscriber stations may be provided so that, upon connection with a given ISP, a subscriber may utilize the browser to retrieve any e-mail received (e.g., stored at the ISAP processor/memory module) via the access equipment located at the ISP. As noted, if the subscriber at a given subscriber station desires a presence on the World Wide Web, the ISAP may further maintain a website hosting module accessible by the pool of ISPs and/or otherwise directly providing ISP services via a server for communications to/from the Internet.

In the described telephony application, the ISAP may further provide a billing manager module that monitors subscriber station access to the pool of ISPs. More particularly, such billing manager module may automatically receive a message from a central office switch upon the establishment of a connection between a given subscriber station and a given ISP station. Such message may be transmitted at the time of connection and may identify the particular subscriber station and connected ISP. This message information may be advantageously utilized to create a transaction record which includes not only the subscriber station and connected ISP information, but also includes transaction start time information obtained via interface with an internal clocking mechanism. Upon disconnection between the subscriber station and ISP, a further message may be automatically sent by the central office switch to the billing manager module wherein the corresponding transaction record may be completed to record the end time for the transaction. The billing manager module may forward transaction records to a subscriber account manager module and ISP account manager module on a periodic basis (e.g. corresponding with subscriber billing periods for telephony services). In turn, the subscriber account manager module and ISP account manager module may automatically generate statements and reports for billing and other postprocessing procedures. As will be appreciated, such an arrangement advantageously allows subscriber stations to be billed for Internet access services at the same time they are billed for telephony services. Further, such an arrangement accommodates a wide variety of subscriber subscription arrangements and service arrangements with ISPs for payment for Internet access services.

Numerous modifications, extensions and advantages of the present invention will be apparent to those skilled in the art upon further consideration of the embodiment discussed below.

DETAILED DESCRIPTION

The present invention is particularly apt for use in conjunction with a telephony service network, as will be described with reference to FIGS. 1–3 below. It will be appreciated by those skilled in the art, however, that the invention may also be utilized in other network arrangements, including for example, local area networks (LANs), wide area networks (WANs) and PBX applications, wherein the Internet access management features described below are implemented upstream from and control the network interface with, for example, a telephony service network.

Figure 1:
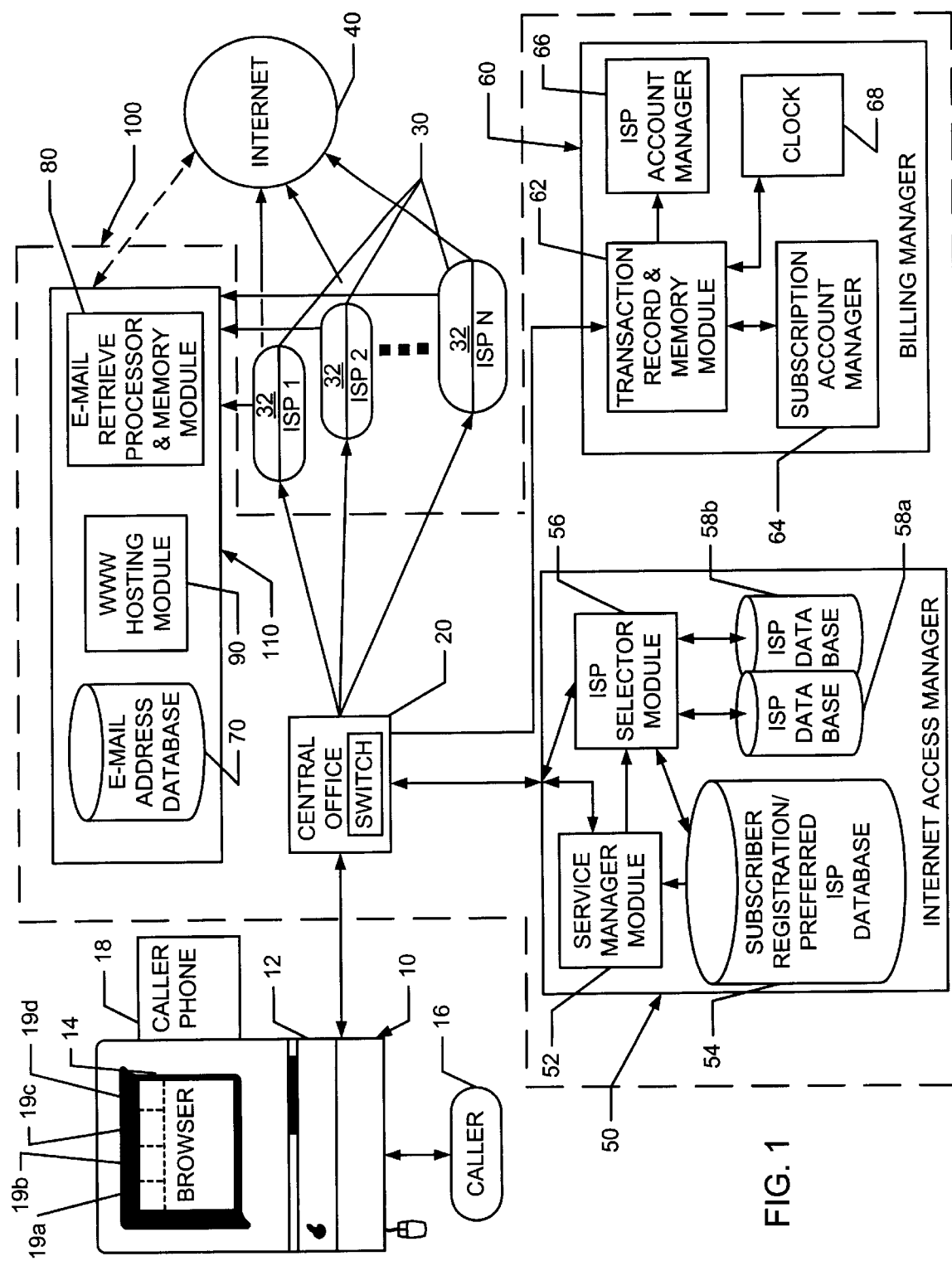
FIG. 1 illustrates one system embodiment of the present invention.

In FIG. 1, one of many telephony subscriber stations 10 is illustrated as being in connection with a central office 20 maintained in telephony service network 100. In the described embodiment, the telephony service provider also provides ISAP services, e.g. on a predetermined subscription basis. As will be appreciated, central office 20 comprises switches (e.g., originating and terminating switches) for providing telephony service to subscribers within a given geographic area and for forwarding other calls to other central offices (e.g. corresponding with the location of the terminating switch for called station numbers). The central office 20 is interconnectable with a plurality of Internet service providers (ISPs)$30_{1\ to\ n}$ for providing access to the Internet 40. More particularly, ISPs $30_{1\ to\ n}$ comprise ISPs who have preregistered with the telephony network service provider to provide ISP services with respect to calls originating within a given geographic region (e.g., based on area code and/or the geographic region associated with a three-digit prefix). The central office 20 is further interconnectable with an Internet access manager 50 and billing manager 60. As will be further discussed, the Internet access manager 50 interacts with central office 20 to automatically select one of the plurality of ISPs $30_{1\ to\ n}$ to provide subscriber station 10 with Internet access when requested.

Subscriber station 10 may include a caller PC 12 having appropriate browser software 14 loaded therein to permit a caller 16 to selectively initiate an Internet access request. Such request may be initiated, for example, when the caller 16 opens up an Internet access icon provided by the browser software. That is, upon selecting such icon, the caller PC 12 would automatically cause an interconnected caller phone 18 to launch a message to central office 20 utilizing a predetermined telephone number corresponding with the Internet access service (e.g. 1-800-INTRNET). Alternatively, a dial-up window could be provided by browser 14, wherein a user 16 would merely enter the predetermined Internet access service telephone number to initiate the message launch by phone 18.

As noted, the central office 20 comprises switches for providing telephony service and may further include at least one switch 22 corresponding with the Internet access service telephone. Upon receipt of a call, the central office switch 22 is capable of suspending processing of the call, transmitting a message to Internet access manager 50 and routing the call upon receipt of routing instructions from Internet access manager 50. By way of example, the central office switch 22 may function as a service switching point utilizing AIN or other known switching capabilities. AIN capabilities may be defined by call origination or call termination models. In this regard, central office switch 22 is preferably capable of functioning as a state driven system, that is, a system which acts pursuant to an event or an occurrence. In the illustrated application, an AIN capable central office switch 22 may include a termination call model or origination call model, specifically a termination attempt trigger or origination attempt trigger. That is, upon receiving an incoming call switch 22 is capable of suspending call processing and sending, for example, a "Termination_Attempt" or "Origination_Attempt" message to Internet access manager 50, which in turn, causes the Internet access manager 50 to instruct the central office switch 22 to route the call to a particular ISP $30_{1\ to\ n}$ or to terminate the call.

When a call to the Internet service access number is received by central office switch 22, the corresponding caller id number (e.g., corresponding with the telephone number for caller phone 18) may be forwarded to the Internet access manager 50 by switch 22. In turn, a service manager module 52 within manager 50 consults a subscriber registration database 54 to ensure that the particular subscriber station 10 has subscribed to the requested Internet access. As will be appreciated, the caller id may be utilized to search subscriber registration database 54 to determine subscription status. In the event that the service manager module 52 determines that a given subscriber station 10 initiating an Internet access request has not subscribed to the Internet access service, the service manager module 52 may send a message (e.g. an "error" message) back to central office switch 22, pursuant to which the call is terminated.

In this regard, the message transmitted back to the central office switch 22 by the Internet access manager 50 may cause the central office switch 22 to launch a message to the subscriber station 10 (e.g. a "fast busy" signal or an "intercept message"). In turn, the browser software 14 loaded on the caller PC 12 may provide programmed capabilities to allow PC 12 to recognize such a message when received from central office switch 22, and in response thereto cause a human-readable message to be displayed to caller 16 at caller PC 12. Such message may indicate, for example, that subscriber station 10 is not a current subscriber of the Internet access service and that the call/request is therefore being terminated. The message may also provide information regarding the steps that caller 16 should take to initiate service, including for example, the provision of a telephone number that can be called to reach a telephony network customer service representative. As will be appreciated, a given caller 16 may maintain multiple subscriber stations, only one of which has "subscribed" for the Internet access service.

In the event that the service manager module 52 confirms that a subscriber station 10 requesting Internet access has a current subscription to the Internet access service, the service manager module 52 may also check with the subscriber database 54 to determine if the subscriber station has designated a "preferred" ISP comprising the ISPs $30_{1\ to\ n}$. If subscriber station 10 has designated a preferred ISP, then service manager module 52 may retrieve a station number (e.g., from a plurality of numbers) corresponding with such ISP from database 54. Alternatively, an ISP selector module 56 may be activated to access the database 54 for preferred ISP information and provide appropriate call routing instructions for the preferred ISP back to the central office switch 22. Additionally, the ISP selector module 56 may access one of a plurality of ISP databases 58a, 58b comprising a listing of telephone numbers corresponding with a plurality (e.g. n) of different ISPs $30_{1\ to\ n}$. In the event preferred ISP service capabilities are not offered, or that a given subscriber station 10 has not otherwise designated a preferred ISP, or that a preferred ISP is not available to provide services (e.g., all preferred ISP station lines busy), then ISP selector module 56 will be activated to select an ISP station number from database 58a or 58b on a predetermined, rotating basis, as will be further described.

As noted, the ISPs $30_{1\ to\ n}$ having telephone numbers included in databases 58a, 58b, and thereby being eligible for providing Internet access, may be determined on a pre-registration basis. That is, ISPs $30_{1\ to\ n}$ may register with a given telephony service provider, such that when a call for Internet service is received from central office switch 22 by a given ISP $30_{1\ to\ n}$, the given ISP $30_{1\ to\ n}$ will automatically receive data sufficient to allow the ISP $30_{1\ to\ n}$ to confirm that the call corresponds with the Internet access service offered by the telephony provider, and in turn the ISP $30_{1\ to\ n}$ will provide the desired Internet access. Such functionality may be provided 30 or otherwise facilitated by access equipment 32 provided to the ISPs $30_{1\ to\ n}$ by the ISAP. Such equipment may include appropriate signal recognition and routing componentry, including componentry for recognizing and routing signals comprising proprietary protocols, access information and/or data. As will be appreciated, the pool of ISPs servicing a given central office 20 and Internet access manager 50 will depend upon the geographic region being serviced by the central office 20 (e.g. service may be provided on a geographic basis corresponding with telephone number prefixes and/or area codes).

Returning to the Internet access manager 50 of FIG. 1, it should be noted that the listing comprising ISP database 58a may be organized such that telephone numbers corresponding with each of the different ISPs $30_{1\ to\ n}$ are listed, or entered, in an alternating manner. For example, if ten ISPs are registered to provide Internet access service for a given geographic area, and if each of such ISPs 30 have registered 10 different telephone numbers for Internet services, the telephone numbers corresponding with the first ISP $30_1$ would be the 1, 11, 21, etc. entries listed in the ISP database 58a, the telephone numbers corresponding with the second ISP $30_2$ would be entries 2, 22, 32, etc. listed in the ISP database 58a, and so on. By arranging ISP database 58a in this fashion, the ISP selector module 56 may simply retrieve an ISP telephone number listing entry-number basis from ISP database 58a, wherein the ISP selector module 56 maintains intelligence as to the last retrieved ISP number entry (i.e., the ISP selector module 56 may then simply add "1" to the entry number to be retrieved for the next request). As such, the ISPs $30_{to\ n}$ may be provided with equal opportunity to provide Internet access services in a "round robin" fashion. Such an approach is reflected in FIG. 3. In the event that one or more of the ISPs $30_{1\ to\ n}$ desire registration of more than a predetermined number of telephone lines (e.g. 10) available to it in the first ISP database 58a, a second ISP database 58b may be provided for access by ISP selector module 56 in the event that all of the Internet access telephone numbers comprising the ISP database 58a are not available at a given time, as may be established on a predetermined basis.

Upon selection of an ISP telephone number, by service module 52 (i.e., if a preferred ISP is designated or by ISP selector module 56), the Internet access manager 50 then transmits such ISP telephone number in a message back to the central office switch 22 that has suspended the Internet access service request call from the requesting subscriber station 10, and such central office switch 22 automatically attempts to route the call to such ISP telephone number. In the event that the central office switch 22 is unable to connect and thereby complete the call to the selected ISP telephone number (e.g. if the line is busy or there is otherwise no answer after a predetermined number of rings), the central office switch 22 will automatically submit a further message to the Internet access manager 50 for call routing instructions. In turn, Internet access manager 50 will again follow the above-noted procedure whereupon service module 52 or ISP selector module 56 will provide another telephone number for a preferred ISP or the telephone number of the next entry occurring in the listing comprising ISP database 58a. In this regard, and as noted above, situations may arise where all lines corresponding with the telephone numbers included in the ISP database 58a are busy or otherwise unavailable. In such instances, the ISP selector module 56 would then access the additional ISP database 58b comprising the telephone numbers for those ISPs that have registered more than a predetermined maximum number of telephone lines for inclusion in database 58a.

As shown in FIG. 1, the ISAP may further provide within the telephony service system 100 an Internet service module 110 that comprises an e-mail address database 70, e-mail retrieval processor and memory module 80, and a website or WWW hosting module 90. Database 70 and processor/memory module 80 may be advantageously included to ensure that subscribers to the Internet access service may send and receive e-mail over the Internet, notwithstanding the fact that they may be connected to the Internet by different ones of the ISPs $30_{1\ to\ n}$ each time they gain Internet access. For such purposes, the telephony service provider may assign each subscriber station an e-mail address that is cross-indexed by caller id (e.g., subscriber station number) in the e-mail address database 70. When a connection is made with a given ISP $30_{1\ to\ n}$ the caller id information for corresponding subscriber station 10 may be automatically provided to the corresponding ISP $30_{1\ to\ n}$. As noted, access equipment 32 provided to each ISP $30_{1\ to\ n}$ may utilize the caller id number to automatically retrieve the caller's corresponding e-mail address from database 70 via dedicated lines 34. Access equipment 32 and dedicated lines 34 may be provided by the ISAP to facilitate, on a proprietary access basis, access to Internet services module 110 when an Internet service request is received by an ISP 30 from within network 100.

To initiate e-mail service, the browser 14 loaded at the caller PC 12 may provide pushbutton e-mail send/receive capabilities, wherein when callers push a button 19a–19c, the e-mail processor/memory module 80 acts to control execution of the command. More particularly, if a caller clicks on button 19a, browser 14 may cause PC 12 to send a message that is routed to processor/memory module 80 via access equipment 32, thereby causing module 80 to return e-mail messages received and stored at module 80 for the caller 16 to read at station 10. As will be appreciated, assignment of e-mail addresses by the ISAP facilitates the receipt and storage of messages at all times at module 80 via ISPs $30_{1\ to\ n}$. For e-mail retrieval/transmission purposes, access equipment 32 may employ the e-mail address for the station 10 retrieved from database 70 upon initial connection. If e-mail creation/transmission is desired, caller 16 may click on a corresponding one of button(s) 19b–19c and browser 14 may cause PC 12 to launch an appropriate message which is is transmitted to the Internet via the connected ISP 30 and routed, in accordance with address input by caller 16 at PC 12. Finally, it should be noted that Internet service module 110 may include a WWW hosting module for providing Web hosting services for subscriber stations 10. In this regard, WWW hosting module 90 may also comprise Internet server capabilities with direct Internet 40 interconnection via one or more high density line(s) 120 (e.g., a T1 line).

The telephony service system 100 may further include a billing manager 60 which provides for billing of subscriber stations 10 for use of the Internet access service and which also collects information regarding the Internet services provided by the various ISPs $30_{1\ to\ n}$. In this regard, when a connection is made by central office switch 22 to one of the ISPs $30_{1\ to\ n}$ a corresponding message is automatically transmitted to the billing manager 60 that comprises the corresponding caller id and corresponding ISP telephone number. Upon receipt of such message, a transaction record module 62 initiates a transaction record, utilizing such information as well as a connection start time determined via interface with clock 68. Upon termination of the call, central switch 22 sends a further message to billing manager 60 causing a further stop time entry to be made in the transaction record utilizing clock 68, wherein the total elapsed time of Internet access can be determined for each given transaction. Module 62 can be provided with memory capability to store transaction records. In turn, a subscriber account manager 64 may periodically receive at least part of the transaction records stored at module 62, and such records may be utilized to automatically generate billing statements for stations 10. Correspondingly, the ISP account manager 66 may periodically receive at least a portion of the transaction records stored at module 62 for purposes of generating billing summaries for usage in management of relations with the various ISPs $30_{1\ to\ n}$. As will be appreciated, the inclusion of billing manager 60 reduces billing, authentication and other operating requirements for ISPS $30_{1\ to\ n}$.

Figure 2:
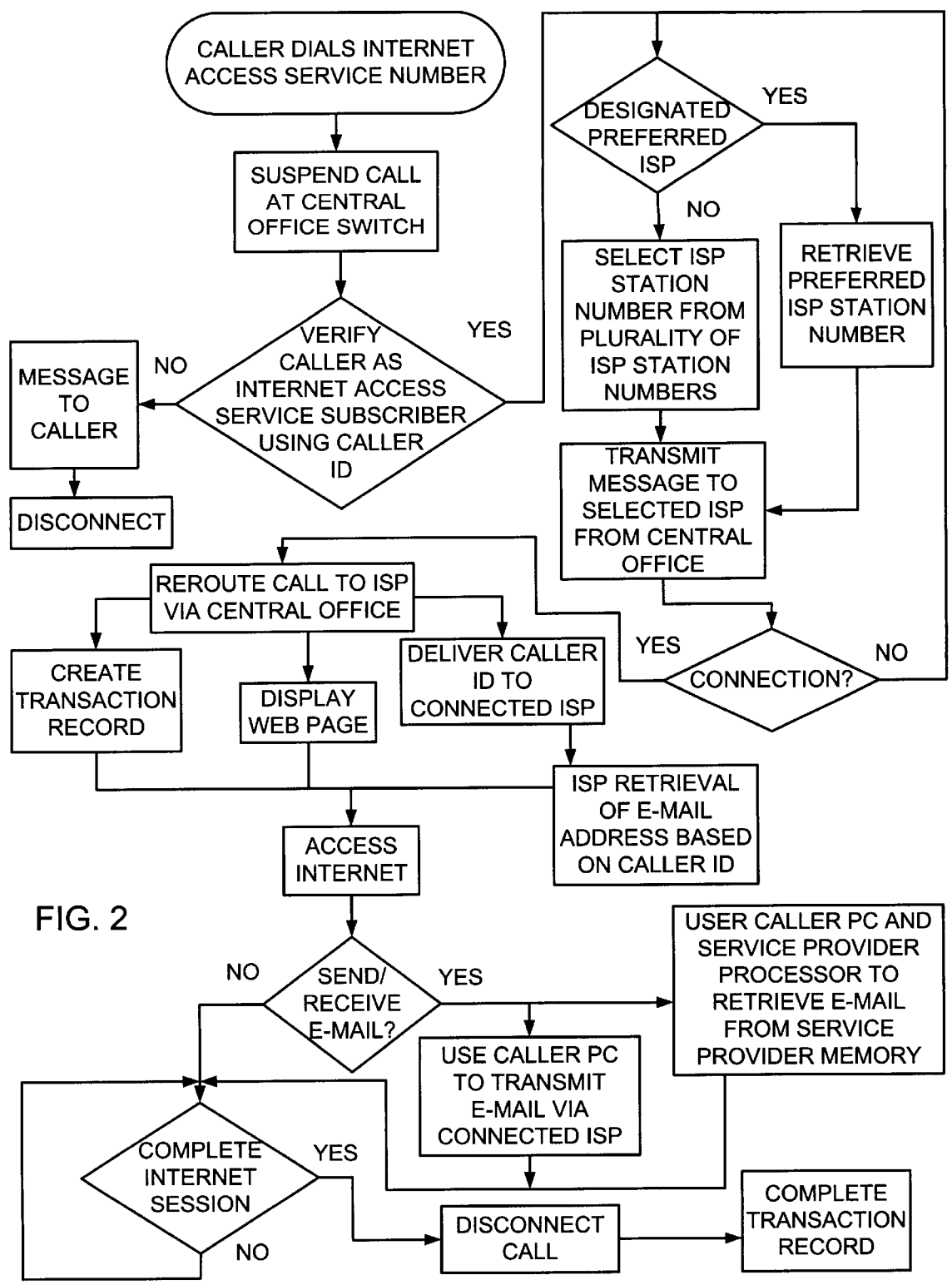
FIG. 2 is a process flow diagram for the FIG. 1 embodiment of the present invention.
Figure 3:
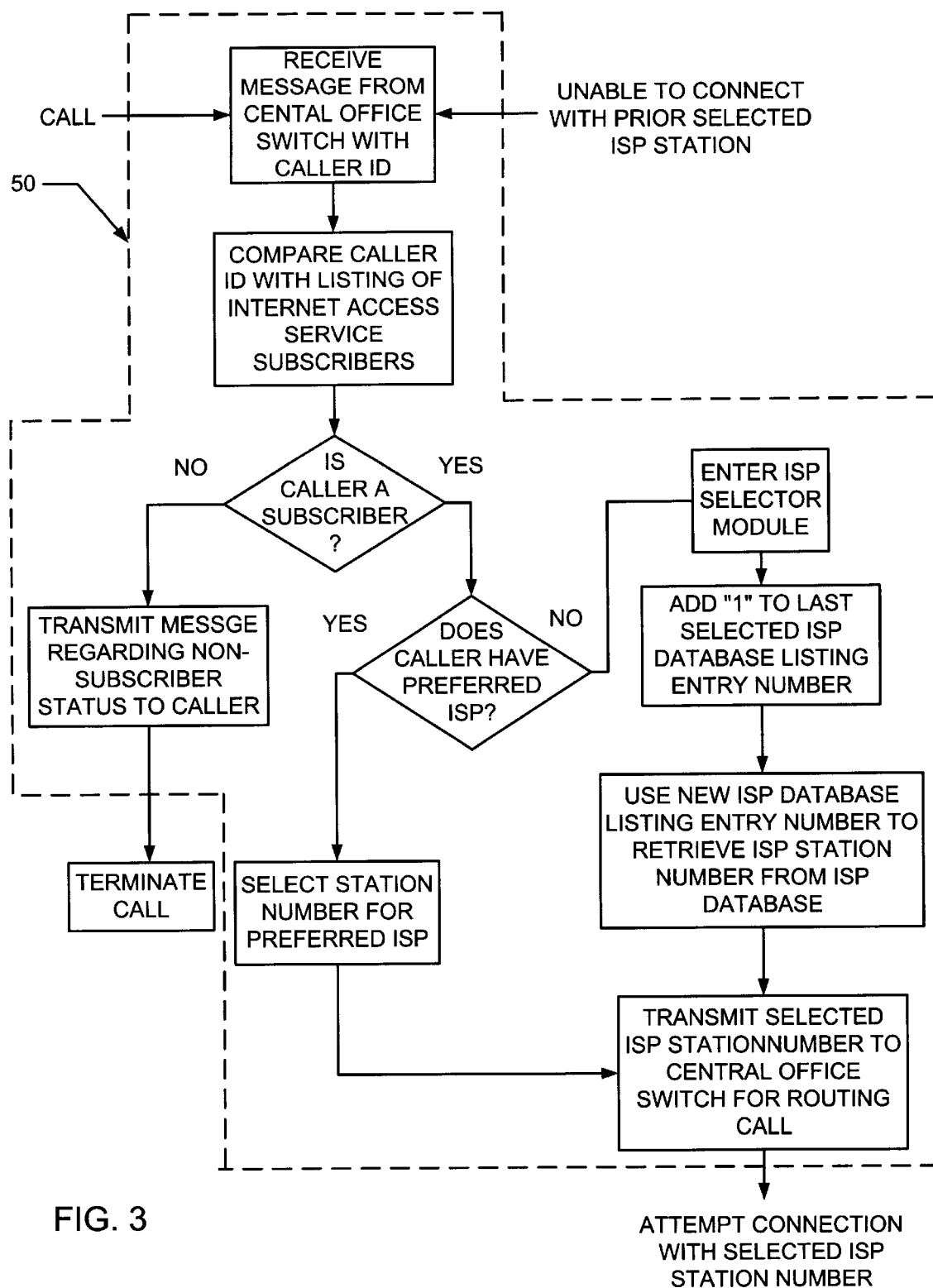
FIG. 3 is a process flow diagram of operations at the service control point, or Internet access manager, in the embodiment of FIG. 1.

With reference to FIGS. 2 and 3, the basic method of operation of a telephony system embodiment of the present invention will again be reviewed. As illustrated, the process is initiated when a caller dials a predetermined Internet access service number from the caller's subscriber service station 10. Such call is received at a central office switch 22 and call processing is suspended. A message is then launched by switch 22 to the Internet access manager 50 that verifies that the caller is an Internet access service subscriber, such verification being made through use of caller id information delivered with the message. In the event that the caller is not a subscriber, a message sent to switch 22 causing switch 22 to send a message to PC 12 resulting in a message to the caller. The call is then terminated or disconnected.

In the event that the caller is verified as a subscriber, a preferred ISP station number may be selected. Alternatively, the ISP selector module 56 may select an ISP telephone number on a round robin or other predetermined basis from a database listing corresponding with a plurality of different ISPs. Such ISP telephone number is then sent back to the central office switch 22 which attempts to route the call to the ISP telephone number provided. In the event a connection is made with such ISP, the call is correspondingly routed by central office switch 22. In the event that the call cannot be completed to the ISP telephone number provided, the central office switch 22 will be automatically triggered (e.g., according to a predetermined AIN termination or origination call model) to transmit a further message to the Internet access manager 50. Upon receipt of the message, the Internet access manager 50 selects another ISP telephone number (e.g., for the preferred ISP or on a predetermined, rotating basis from a ISP database 58a, 58b). This process is continued until an ISP connection is made.

Upon connection with an ISP 30, the caller's caller id is automatically provided to the ISP 30, the billing manager 60 is activated to initiate creation of a transaction record, and a web page is preferably displayed at the caller PC 12, thereby confirming access to the caller 16. Preferably, the web page displayed at PC 12 will be the same, regardless of which ISP 30 is providing Internet access. The caller 16 may then selectively utilize browser 14, and particularly browser buttons 19, to initiate the sending or retrieval/review of e-mail messages. If e-mail transmission or receipt is desired, the ISP 30 will utilize an e-mail address previously and automatically retrieved from e-mail database 70 by the ISP utilizing the caller id provided to the ISP 30 upon initial connection. Correspondingly, the e-mail retrieval processor 80 will control retrieval activities. If e-mail activities are not desired, a caller may otherwise access the Internet and complete as many functions as desired. Upon termination of the Internet access, a message is automatically sent to the billing manager 80 to complete the transaction record, and the call is otherwise disconnected.

The above-described embodiment is illustrative of one application of the present invention. Numerous modifications and extensions will be apparent to those skilled in the art and are intended to be within the scope of the present invention as contemplated by the claims that follow.

What is claimed is:

1. A method for providing Internet access in a network comprising a plurality of user stations, comprising:

providing a predetermined Internet service access number for use in a network comprising a plurality of user stations, said predetermined Internet service access number corresponding with a predetermined network address;

receiving a message at said network address from a user station in the network, said message corresponding with a request for Internet access;

accessing a listing which includes a plurality of Internet Service Providers station numbers and automatically identifying and selecting one of the Internet Service Provider station numbers, at least two of said Internet Service Provider station numbers corresponding with different Internet Service Providers; and using said one Internet Service Provider station number to attempt to connect over a telephony network said user station with an Internet Service Provider corresponding with said one Internet Service Provider station number.

2. A method as recited in claim 1, wherein when a connection is not made with the Internet Service Provider corresponding with said one Internet Service Provider station number, said method further comprises:

selecting another Internet Service Provider station number; and using said another Internet Service Provider station number to attempt to connect said user station with an Internet Service Provider corresponding with said another Internet Service Provider station number.

3. A method as recited in claim 2, wherein when a connection is not made with said another Internet Service Provider station number, said method further comprises:

repeating said selecting and using steps of claim 2 until a connection is made with an Internet Service Provider station number.

4. A method as recited in claim 1, further comprising:

determining a user identification number corresponding with said user station responsive to receipt of said message at said network address.

5. A method as recited in claim 4, comprising:

using said user identification number to verify that said subscriber station is a current subscriber of a corresponding Internet access service.

6. A method as recited in claim 4, wherein upon receiving said request at said Internet Service Provider, said method further comprises:

transmitting said user identification number to said Internet Service Provider.

7. A method as recited in claim 6, further comprising:

retrieving an e-mail address using said caller identification number.

8. A method as recited in claim 7, further comprising:

initiating a request for at least one of e-mail transmission from and e-mail receipt at said subscriber station; and employing a computer processor to control completion of said e-mail request.

9. A method as recited in claim 1, wherein said network is a telephony services network.

10. A method for providing Internet access service to telephony subscribers in a telephony network maintained by a telephony service provider, comprising:

providing a predetermined Interact service access number to telephony subscribers in a telephony service network;

receiving a call from a subscriber station at a central office switch corresponding with said predetermined Interact service access number;

accessing a listing of which includes a plurality of Internet Service Provider station numbers and identifying and selecting one of the plurality of Internet Service Provider station numbers, where at least two of said plurality of Internet Service Provider station numbers corresponding with different Internet Service Providers; and using said selected Internet Service Provider station number to attempt to connect over the telephony network said subscriber station with an Internet Service Provider corresponding with said one Internet Service Provider station number.

11. A method as recited in claim 10, wherein prior to said selecting step, said method further comprises:

using a caller identification number corresponding with said subscriber station to verify that the subscriber station is a current subscriber of an Internet access service offered by said telephony service provider.

12. A method as recited in claim 10, wherein said selected Internet service provider station number corresponds with an Internet Service Provider designated by said subscriber station for use on a preferred basis.

13. A method as recited in claim 10, said selecting step including:

obtaining said selected Internet service provider station number from a database comprising said plurality of Internet Service Provider station numbers on a predetermined, rotating basis.

14. A method as recited in claim 10, further comprising:

using a caller identification number corresponding with said subscriber station to obtain an e-mail address for said subscriber station from an e-mail database maintained by said telephony service provider.

15. A method as recited in claim 14, wherein said e-mail address for said subscriber station is assigned by said telephony service provider.

16. A method as recited in claim 14, further comprising:

directing e-mail instructions from said subscriber station to a processor maintained by said telephony service provider via said selected Internet Service Provider, wherein said processor controls execution of said e-mail instructions.

17. A method as recited in claim 10, further comprising:

transmitting a message from said central station switch to a service control point in said telephony network in response to receipt of said call at said central office switch; and suspending processing of said call at said central office switch during said selecting step.

18. A method as recited in claim 10, wherein when a connection is not made with the Internet Service Provider corresponding with said selected Internet Service Provider station number, said method further comprises:

selecting another Internet Service Provider station number; and using said another Internet Service Provider station number to connect said subscriber station with an Internet Service Provider corresponding with said another Internet Service Provider station number.

19. A method as recited in claim 18, wherein when a connection is not made with said another Internet Service Provider station number, said method further comprises:

repeating said selecting and using steps of claim 18 until the connection with an Internet Service Provider is completed.

20. A method as recited in claim 10, further comprising:

routing said call to said Internet Service Provider station number upon connection therewith;

transmitting a first message from said central office switch upon said connection;

initiating a transaction record upon receipt of said first message;

transmitting a second message from said central office switch upon termination of said connection;

completing at least a portion of said transaction record upon receipt of said second message.

21. A system for providing Internet access service to telephony subscribers in a telephony network maintained by a telephony service provider, comprising:

a central office switch for receiving a call from a subscriber station within a telephony network, said call corresponding with a request for Internet access and for transmitting a message in response to receipt of said call; and a service control point within said telephony network for receiving said message and for automatically accessing a database containing a listing of a plurality of Internet Service station numbers, and selecting one of the plurality of Internet Service Provider station numbers from a plurality of Internet Service Provider station numbers, at least two of said plurality of Internet Service Provider station numbers corresponding with different Intent Service Providers, wherein said one selected Internet Service Provider station number is transmitted by said service control point to said central office switch to attempt a connection over the telephony network with said selected Internet Service Provider.

22. A system as claimed in claim 21, said service control point including:

a database including said plurality of Internet Service Provider station numbers; and a selector for selecting one of said Internet Service Provider station numbers from said database on a predetermined basis.

23. A system as claimed in claim 21, further comprising:

an e-mail processor and memory, maintained by said telephony service provider, for controlling execution of e-mail instructions from said subscriber station and for storing e-mail messages for said subscriber station, respectively.

24. A system as claimed in claim 23, further comprising:

an e-mail address database, maintained by said telephony service provider, for cross-indexing caller identification numbers with e-mail addresses assigned by said telephony service provider.

* * * * *